May 1, 1951     J. W. WICKNER     2,550,896
ADJUSTABLE FOOD GRATER
Filed Dec. 11, 1946

INVENTOR
JESS W. WICKNER
BY Wheeler, Wheeler + Wheeler
ATTORNEYS

Patented May 1, 1951

2,550,896

UNITED STATES PATENT OFFICE 2,550,896

ADJUSTABLE FOOD GRATER

Jess W. Wickner, Milwaukee, Wis.

Application December 11, 1946, Serial No. 715,586

9 Claims. (Cl. 146—180)

My invention relates to improvements in adjustable food graters.

An object of my invention is to provide convenient means for centrally supporting grating plates above dishes of varying diameters.

More specifically, it is my object to provide a grating plate with a mounting formed in overlapping sections so connected with each other by a centralizing cross rod that the mounting can be extended and contracted to fit any receiving vessel without changing the midway position of the grater with reference to the ends of the mounting.

A further object is to provide means whereby yoke-shaped mounting rods may have the yoke legs slidably supported in sheet metal guides, in association with grating plates adapted for snap-on connection with the guides and a centering cross rod geared to the yoke legs.

In the following description, reference is had to the accompanying drawings, in which Figure 1 is a perspective view of a grating assembly embodying my invention.

Like parts are identified by the same reference characters throughout the several views.

Figure 1:
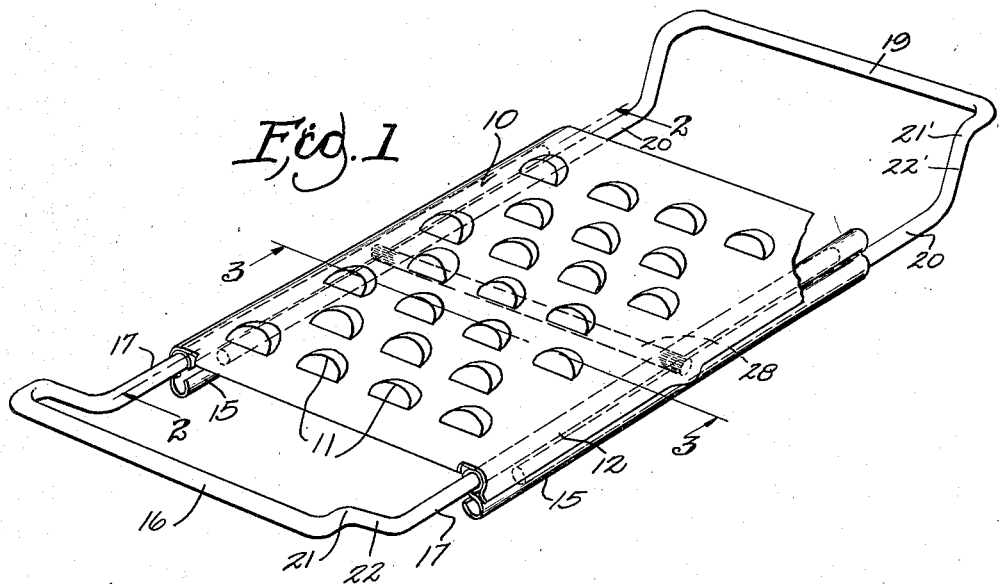

A grating plate 10 provided with struck-up grating or cutting edges 11 of any ordinary type, has its resilient side marginal portions downwardly curved at 12, with edges outturned, whereby these marginal portions of the grater plate may be snapped onto the upper lobes of sheet metal holders 15 of a generally figure 8 cross section, the lobes of which serve as guides for the telescopic supporting yokes now to be described.

Each of these supporting yokes is preferably formed integrally of a single rod, having a central portion disposed transversely of the grater plate and leg portions telescopically receivable in the lobes of the holders 15. One of these yokes has its transverse central portion 16 provided with legs 17 telescopically receivable in the upper lobes of the holders 15. The other yoke has its transverse central portion 19 provided with legs 20 telescopically receivable in the lower lobes of the holder 15. The legs 17 of one of the yokes are inserted in the upper lobes of the holders 15, and the legs 20 of the other yoke are inserted in the lower lobes of the holder 15 at the opposite end of the assembly.

Between the end portion 16 of one of the yokes and its legs 17, the rod of which it is composed is inturned at 21 and downwardly offset at 22, and the other yoke has a correspondingly inturned portion 21' and a downward offset 22', whereby these yokes may be supported from the margins of a receptacle for the grated material and telescopically adjusted in the holders in correspondence with the diameter of the receiving receptacle.

Figure 2:
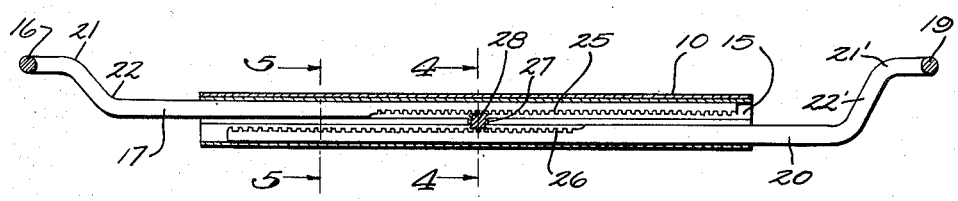
Figure 2 is a sectional view drawn to line 2—2 of Figure 1.
Figure 3:
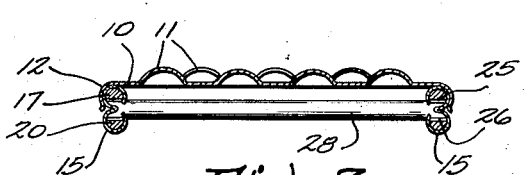
Figure 3 is a sectional view drawn to line 3—3 of Figure 1.
Figure 4:
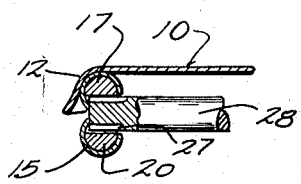
Figure 4 is a fragmentary view of a portion of the centering rod and grater plate, showing the same partly in section, drawn to line 4—4 of Figure 2.
Figure 5:
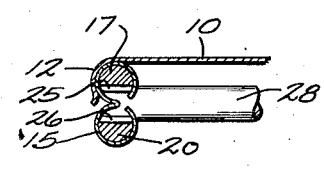
Figure 5 is a similar detail, with the portion in section drawn to line 5—5 of Figure 2.

In the drawings, the left hand yoke has its legs 17 provided with depending rack teeth 25 and the other yoke has its legs 20 provided with upstanding rack teeth 26. These rack teeth 25 and 26 mesh with pinion teeth 27 on the ends of a centering cross rod 28, the inner walls of the holder lobes being centrally cut away to allow the cross rod 28 to extend between the yoke legs for engagement of the pinion teeth 27 with the respective racks, as best shown in Figures 2 and 4. The outer walls of the holders prevent the rod 28 from shifting laterally and the engagement of its pinion teeth 27 with the respective rack teeth 25 and 26 requires each yoke to move in an opposite direction from the other when the yokes are being extended or retracted, and the movement of each yoke is necessarily equal to that of the other.

Preferably the rack teeth and pinion teeth are formed by milling the surfaces of the respective rods, as illustrated in the drawings.

From the foregoing description it will be obvious that the grater plate 10 will always be supported over the center of any receiving vessel, with the opposite margins of which the yokes are engaged, regardless of the diameter of the vessel.

Also, grater plates 10 of different sizes and different grating characteristics may be interchangeably substituted one for another and fixedly supported by the holders 15 if provided with side margins engageable with the holders.

I claim:

1. The combination with a food grater plate, of a supporting mounting having end pieces upwardly and outwardly turned for engagement with the walls of a receiving vessel, rack and pinion connections between the end pieces adapted to permit their adjustment to vessels of different diameters, spacing devices for the connecting racks, and snap-on connections between the grater plate and the spacing devices.

2. The combination of a pair of end pieces each formed to engage a vessel margin, a pair of parallel rods connected with each end piece and provided with rack teeth, the rods of one end piece having upwardly extending rack teeth and those of the other end piece having downwardly extending rack teeth, a cross rod between the end pieces having pinions engaged with the upwardly and downwardly extending teeth, and means for supporting a grater plate from said pairs of parallel rods, said plate supporting means comprising sheet metal guides having the general form of a figure 8 in cross section, with said rods in telescoping relation to the respective lobes of the guides.

3. The combination described in claim 2 in which the cross rod is located midway between the vessel engaging end pieces and the guides are formed to receive its pinions and hold them with their teeth in engagement with the rack teeth on the rods.

4. The combination with a pair of sheet metal guides, each having the general form of a figure 8 in cross section, of a cross rod having its ends mounted in the central portions of the respective guides and provided with pinion teeth, supporting rods each telescopically adjustable in one of the guide lobes and provided with rack teeth, some of which are in mesh with the associated pinion teeth on the cross rod, and a grater plate mounted on said guides.

5. A combination as described in claim 4, in which the grater plate has resilient margins adapted for snap-on engagement with the upper lobes of the guides, whereby grater plates having different grating characteristics may be interchangeably connected with said guides.

6. The combination with a food grater, of a pair of guides with which the grater side margins are connected, two pairs of supporting rods, each in sliding connection with one of the guides, motion transmitting connections including mating rack teeth formed on the rods and a pair of axially connected pinions interposed therebetween for requiring the rods of each pair to move along the guides in opposite directions and to an equal extent, and a connection between the outer ends of each pair of rods, engageable with the margin of a vessel in receiving relation to the grater.

7. A support for food grater plates, comprising the combination with a pair of guides with which opposing margins of the grater plate may be detachably engaged, a cross rod spanning the space between the central portions of said guides, said guides being broken away centrally to provide bearings for said cross rod, a set of oppositely facing yoke shaped members having their legs slidably mounted on said guides, and rack and pinion connections between the yoke legs and said cross rod.

8. In a grater plate mounting for centering the plate over vessels of different diameters, a pair of U-shaped yokes having racks formed in the several legs thereof, a pair of guides having a plurality of passages therethrough for severally receiving the yoke legs, and a rod extending between and rotatably supported in the guides at substantially the centers thereof and having the ends thereof bearing in the guides for limiting end-wise movement of the rod, the rod being provided with a plurality of pinions for severally engaging a rack on each yoke for moving the yokes equally and in opposite directions.

9. A food grater for use with vessels of different diameters and comprising a pair of U-shaped yokes having racks formed in the several legs thereof, a pair of guides having a plurality of passages therethrough for severally receiving the yoke legs, a transversely disposed rod provided with pinions severally engaging one rack on each yoke for moving both legs of each of the yokes equally and in opposite directions, and a grater plate having resilient side margins removably engaged with the several guides, the plate being retained substantially centrally on a vessel upon adjustment of the yokes to the diameter thereof.

JESS W. WICKNER.

REFERENCES CITED

The following references are of record in the file of this patent:

UNITED STATES PATENTS

| Number | Name | Date |
|---|---|---|
| 555,834 | Taylor | Mar. 3, 1896 |
| 1,016,249 | Comtois | Feb. 6, 1912 |
| 1,479,805 | Gutridge | Jan. 8, 1924 |
| 1,845,522 | Rowley | Feb. 16, 1932 |

FOREIGN PATENTS

| Number | Country | Date |
|---|---|---|
| 522,467 | France | Mar. 31, 1921 |
| 666,212 | Germany | Oct. 13, 1938 |